United States Patent
Murata et al.

(10) Patent No.: US 6,686,018 B2
(45) Date of Patent: Feb. 3, 2004

(54) OPTICAL DISK AND METHOD OF PRODUCING THE SAME

(75) Inventors: Shozo Murata, Kanagawa (JP); Yukitoshi Tajima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/194,015

(22) Filed: Jul. 10, 2002

(65) Prior Publication Data

US 2002/0182402 A1 Dec. 5, 2002

Related U.S. Application Data

(62) Division of application No. 09/499,496, filed on Mar. 7, 2000, now Pat. No. 6,468,618.

(30) Foreign Application Priority Data

| Feb. 9, 1999 | (JP) | ............................................. 11-31723 |
| Jul. 5, 1999 | (JP) | ........................................... 11-190423 |
| Sep. 14, 1999 | (JP) | ........................................... 11-259806 |
| Oct. 20, 1999 | (JP) | ........................................... 11-298526 |
| Oct. 20, 1999 | (JP) | ........................................... 11-298738 |

(51) Int. Cl.[7] ................................................ B32B 3/02
(52) U.S. Cl. ..................... 428/64.1; 428/64.4; 264/1.33
(58) Field of Search .............................. 428/64.1, 64.4, 428/473.5, 474.4, 913; 430/270.11, 495.1, 945; 264/1.33, 338

(56) References Cited

U.S. PATENT DOCUMENTS

| 5,897,814 A | * | 4/1999 | Niemeyer | ................... 264/1.33 |
| 6,146,558 A |   | 11/2000 | Feist |   |
| 6,171,527 B1 |   | 1/2001 | Warino |   |
| 6,276,656 B1 |   | 8/2001 | Baresich |   |
| 6,508,961 B1 | * | 1/2003 | Feist | .......................... 264/1.33 |
| 6,533,968 B1 | * | 3/2003 | Feist | .......................... 264/1.33 |

FOREIGN PATENT DOCUMENTS

| EP | 518213 A2 | 12/1992 |
| EP | 0640458 | 3/1995 |
| JP | 62180541 | 8/1987 |
| JP | 6371325 | 3/1988 |
| JP | 63071325 | 3/1988 |
| JP | 01246391 | 10/1989 |
| JP | 1315042 | 12/1989 |
| JP | 03030134 | 2/1991 |
| JP | 3119534 | 5/1991 |
| JP | 3295041 | 12/1991 |
| JP | 4274038 | 9/1992 |
| JP | 5198011 | 8/1993 |
| JP | 5200757 | 8/1993 |
| JP | 05298752 | 11/1993 |
| JP | 10149587 | 6/1998 |
| JP | 11007663 | 1/1999 |
| WO | WO9956935 | 11/1999 |

OTHER PUBLICATIONS 8.8.4 Bismuth and Bismuth Alloy.

* cited by examiner

*Primary Examiner*—Elizabeth Mulvaney
(74) *Attorney, Agent, or Firm*—Cooper & Dunham LLP

(57) ABSTRACT

An optical disk and a method of producing it, particularly a stamper for molding a semiconductor disk base capable of forming an optical disk sufficiently compatible with commercially available CD (Compact Disk) players, a method of producing a stamper, a method of producing an optical disk base, a method of producing an optical disk, and an optical disk base and optical disk are disclosed. The present invention improves both of transferability and tact of an optical disk base molding cycle, allows a fine pattern to be formed in a transfer surface, and makes it needless to change existing molding equipment. In addition, when guide grooves formed in the optical disk are filled with a pigment by spin coating, the guide grooves have a substantially uniform configuration in the radial direction of the disk. The optical disk is sufficiently compatible with various CD players available on the market.

22 Claims, 12 Drawing Sheets

OPTICAL DISK AND METHOD OF PRODUCING THE SAME

This application is a division of application Ser. No. 09/499,496, filed Mar. 7, 2000 now U.S. Pat. No. 6,468,618 issued Oct. 22, 2002.

BACKGROUND OF THE INVENTION

The present invention relates to an optical disk and a method of producing the same and more particularly to a stamper for molding an optical disk base highly compatible with commercially available CD (Compact Disk) players, a method of producing the stamper, a method of producing an optical disk base, a method of producing an optical disk, and an optical disk base, and an optical disk.

In parallel with the spread of optical disks, there is an increasing demand for the timely delivery of high quality optical disks to the market. Particularly, to enhance quantity production of optical disks, it is necessary to reduce a disk base molding cycle.

To produce an optical disk, a stamper formed with a transfer surface is positioned in one of a pair of mold parts forming a cavity therebetween. Molten resin is injected into the cavity and then cooled off. Subsequently, the mold parts are separated in order to remove the cooled resin. As a result, the transfer surface of the stamper is transferred to the resin, forming a recording surface.

It is a common practice with an optical disk to hold the mold parts at a temperature of about 200° C. lower than the temperature of resin to be injected into the cavity. This promotes the cooling and solidification of the resin injected into the cavity. Such a mold temperature is determined by the tradeoff between transferability and an increase in the tact of a disk base molding cycle. Specifically, the mold temperature should be as low as possible for increasing the tact, but would degrade transferability if excessively low. On the other hand, a high mold temperature would enhance transferability, but would increase a period of time necessary for the resin to be cooled to a parting temperature and would thereby lower the yield of optical disks.

Japanese Patent Laid-Open Publication Nos. 7-178774, 10-149587 and 6-259815 each propose to provide a mold or a stamper with a heat insulating ability so as to enhance both the transferability and the tact of the disk base forming cycle. Specifically, Laid-Open Publication No. 7-178774 teaches a heat insulating body removably positioned in a mold in such a manner as to face the rear of a stamper. Laid-Open Publication No. 10-149587 teaches a heat insulating ceramic layer formed on a mold in such a manner as to face the rear of a stamper. Further, Laid-Open Publication No. 6-259815 teaches a stamper whose front (transfer surface) is plated with Ni (nickel) containing 20% to 30% of polytetrafluoroethylene by electroless plating. Polytetrafluoroethylene has a grain size of 1.0 $\mu$m or less. The resulting Ni film is 50 nm to 70 nm thick.

However, none of the above conventional technologies can enhance both the transferability and the tact of a disk base molding cycle at a high level. Laid-Open Publication No. 6-259815 has a problem that the Ni film formed on the transfer surface of a stamper obstructs the fine patterning of the transfer surface. Laid-Open Publication No. 10-149587 has a problem that the mold itself must be redesigned or replaced, wasting existing molding equipment.

Spin coating has customarily been used to coat a molded disk base with an organic pigment which forms a recording layer because spin coating is desirable from the easy process and low cost standpoint. While the thickness distribution of the recording layer can be controlled on the basis of coating conditions, it is difficult to control the distribution of the pigment in guide grooves. Specifically, to form the recording layer, a disk base is caused to spin such that a pigment solution sequentially spreads outward over the entire disk base due to a centrifugal force. However, the centrifugal force differs from one position to another position in the radial direction of the disk base. This, coupled with the fact that the solvent evaporates while spreading outward, causes the pigment to fill outer guide grooves more easily than inner guide grooves.

It follows that if the guide grooves of the disk base have a uniform configuration from the inner circumference to the outer circumference, the configuration of the guide grooves filled with the pigment differs from one position to another position in the radial direction. This scatters reflectance and tracking error and other signal characteristics and makes it difficult to produce constant quality, reliable optical disks. In addition, the resulting optical disks are not satisfactorily compatible with commercially available CD players.

Japanese Patent Laid-Open Publication Nos. 5-198011 and 5-198012, for example, disclose implementations for correcting the above difference in configuration between the inner guide grooves and the outer guide grooves filled with the pigment. The implementations are such that the configuration (depth) of the guide grooves to be formed in a disk base or a stamper is intentionally varied beforehand. None of such implementations, however, gives consideration to the decrease in the fluidity of molten resin ascribable to temperature fall. Therefore, the implementations cannot realize desirable transferability alone when a high cycle is desired, aggravating the scattering of optical disks in signal characteristics.

SUMMARY OF THE INVENTION

It is therefore an object of the present invention to enhance both the transferability and the tact of a disk base molding cycle at the same time.

It is another object of the present invention to allow a transfer surface to be finely patterned.

It is yet another object of the present invention to make it needless for existing molding equipment to be redesigned or replaced.

It is a further object of the present invention to provide an optical disk sufficiently compatible with commercially available CD players by allowing guide grooves filled with a pigment by spin coating to have a substantially uniform configuration at any position in the radial direction.

In accordance with the present invention, a stamper for molding an optical disk base includes a transfer surface for molding the optical disk base, and a heat insulating material extending in parallel to, but not contacting, the transfer surface.

Also, in accordance with the present invention, a method of producing a stamper for molding an optical disk base includes the steps of electroforming on a photoresist master having a transfer surface pattern an Ni layer having a transfer surface to which the transfer surface pattern is transferred, forming a heat insulating layer on the Ni layer, and separating the photoresist master from the Ni layer.

Further, in accordance with the present invention, a method of producing an optical disk base includes the steps of injecting molten resin into a cavity formed by a pair of mold parts and accommodating a stamper having a transfer surface for molding the optical disk base and a heat insulating layer extending in parallel to, but not contacting, the transfer surface, and separating the pair of mold parts to thereby remove the resin cooled off.

Furthermore, in accordance with the present invention, a method of producing an optical disk includes the steps of injecting molten resin into a cavity formed by a pair of mold parts and accommodating a stamper having a transfer surface for molding the optical disk base and a heat insulating layer extending in parallel to, but not contacting, the transfer surface, separating the pair of mold parts to thereby remove the resin cooled off, coating a transfer surface of the resin with a recording material to thereby form a light absorption layer, forming a reflection film on the light absorption film, and forming a protection film on the reflection film.

Moreover, in a method of producing an optical disk base, a heat insulating material is positioned beneath a recording area formed on the surface of a stamper for molding an optical disk.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
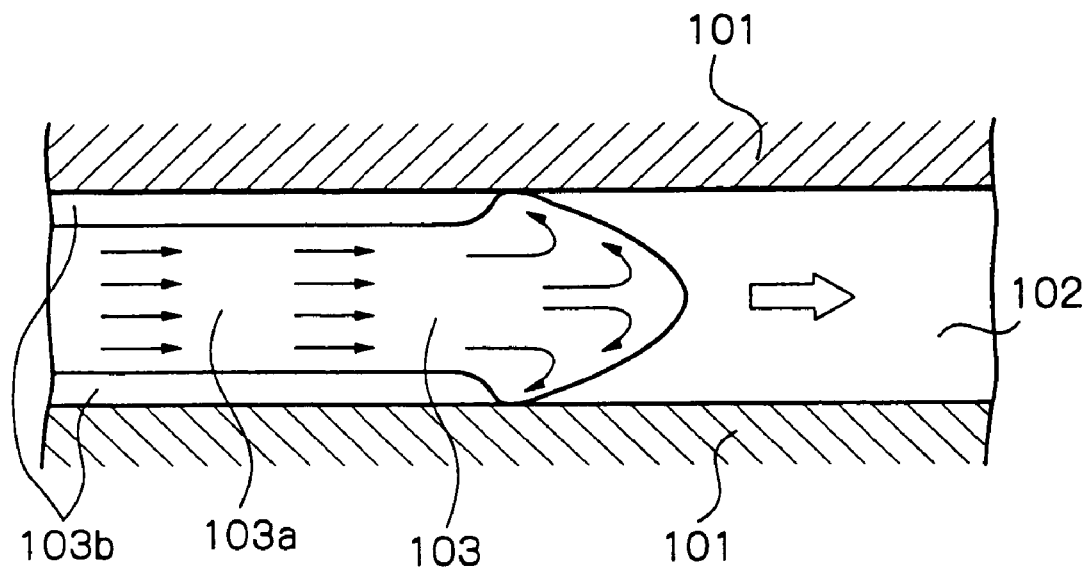
FIG. 1 shows how resin is injected into a cavity formed between a pair of mold parts.

To better understand the present invention, why excessively low mold temperature deteriorates transferability will be described. FIG. 1 shows a pair of mold parts 101 forming a cavity 102 therebetween. Molten resin 103 is injected into the cavity 102. First, the molten resin 103 flows into the cavity 102 as an entirely fluid layer 103a. In FIG. 1, thin arrows show directions in which the resin 103 moves while a bold arrow shows a direction in which the resin 103 flows in the cavity 102. As the resin 103 flows in the cavity 102, its portion contacting the mold parts 101 is sharply cooled off. Therefore, if the temperature of the mold parts 101 is excessively low, the resin 103 instantaneously solidifies in the form of a skin layer 103b. The skin layer 103b prevents the resin 103 from sufficiently filling a fine pattern formed in a stamper, resulting in defective transfer. The resulting optical disk lacks in quality, i.e., desirable signal characteristic.

Preferred embodiments of the present invention will be described hereinafter. It is to be noted the reference numerals used in each embodiment are independent of the reference numerals of the other embodiments, i.e., the same reference numerals do not always designate the same structural elements.

1st Embodiment

This embodiment pertains to the production of various kinds of optical disks including a CD, a CD-R, an MD (Mini Disk), an MO (Magnetooptical disk), PD (Phase change optical Disk) and a DVD (Digital Video Disk). In the following description, stampers are classified into a heat-insulated master stamper and a heat-insulated son stamper produced from a master by transfer via a mother. Both of these stampers are used to produce optical disk bases.

Figure 2A:
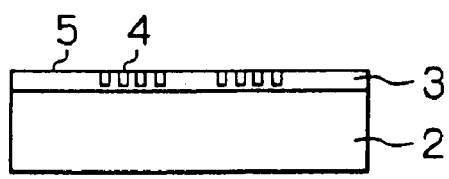
FIGS. 2A through 2F are side elevations demonstrating a first embodiment of the present invention for producing a stamper or heat-insulated master stamper for molding an optical disk base.
Figure 2B:
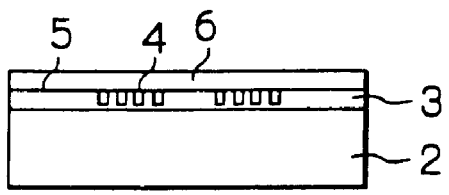

First, a heat-insulated master stamper and a method of producing it will be described with reference to FIGS. 2A–2F and FIG. 3. As shown in FIG. 2A, a photoresist layer 3 is formed on a glass master 2 and then exposed by a laser beam and developed to form a pattern of fine projections and recesses 4 constituting a disk surface pattern. The glass master 2 with the pattern 4 serves as a master. An electroconductive film layer 5 is formed on the pattern 4. Subsequently, as shown in FIG. 2B, Ni electroforming is effected by using the electroconductive film layer 5 as a cathode, thereby forming an about 25 μm thick Ni layer 6. The Ni layer 6 serves as an Ni electroformed layer and a metal layer for master transfer.

Figure 2C:
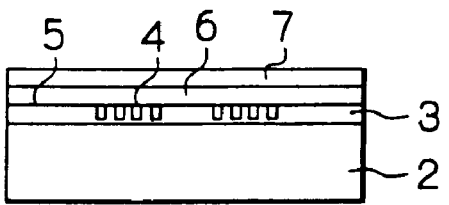

As shown in FIG. 2C, a heat insulating layer 7 is formed on the Ni layer 6 and implemented by a heat resistant polymer. Specifically, the Ni deposited surface of the electroconductive film 4 is coated with a partially-imidized straight chain type polyamide acid solution by spin coating or spray coating. The coated polyamide acid solution is then subjected to cyclodehydration with the application of heat thereto to imidize the coated polyamide acid solution. As a result, a polyimide heat insulation layer 7 is formed. The heat insulating layer 7 has a thermal conductivity preferably lower than 94 W/m. k and lower than the thermal conductivity of Ni customarily used for a mold not shown. The heat insulating layer 7 should preferably be 150 μm thick or less, more preferably between 5 μm and 150 μm. The heat insulating layer 7 may be implemented by a polyamideimide heat insulating layer, if desired. The polyamideimide heat insulating layer may be formed by the same technology as used for the polyimide insulating layer 7. The heat insulating layer 7, whether it be polyimide or polyamideimide, can be easily provided with any desired thickness.

Figure 2D:
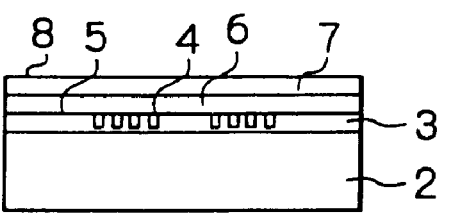
Figure 2E:
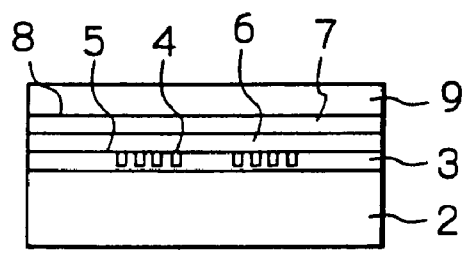
Figure 2F:
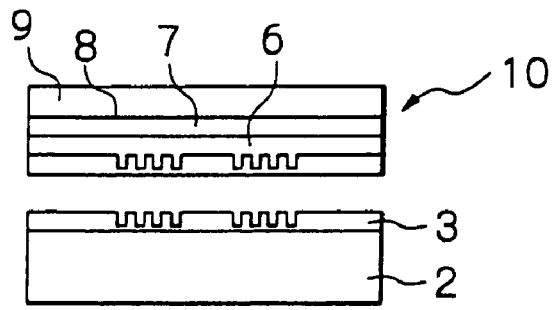

As shown in FIG. 2D, a second electroconductive film 8 is formed on the polyimide heat insulating layer 7. Then, as shown in FIG. 2E, Ni electroforming is effected by using the second electroconductive film 8 as a cathode, thereby forming a second Ni layer 9. The resulting laminate formed on the glass master 2 and made up of the first Ni layer 6, heat insulating layer 7 and second Ni layer 9 is about 300 m thick and has increased mechanical strength.

Figure 3:
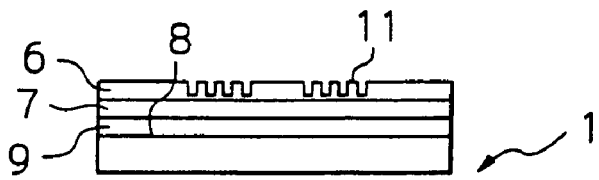
FIG. 3 is a side elevation showing part of the heat-insulated master stamper.

Subsequently, as shown in FIG. 2, the laminate is separated from the glass master 2 to constitute a heat-insulated master stamper blank 10. After the photoresist 3 remaining on the blank 10 has been removed, there are sequentially executed the formation of a protection film, grinding of the rear surface, inside and outside diameter pressing, and signal and defect tests. As a result, a heat-insulated master stamper 1 is completed and includes a transfer surface 11 to which the pattern 4 of the glass master 2 is transferred. FIG. 3 shows part of the above master stamper 1. As shown, the master stamper 1 is made up of the Ni layer 6, heat insulating layer 7 and Ni layer 9 and has the transfer surface 11 on its front.

Figure 4:
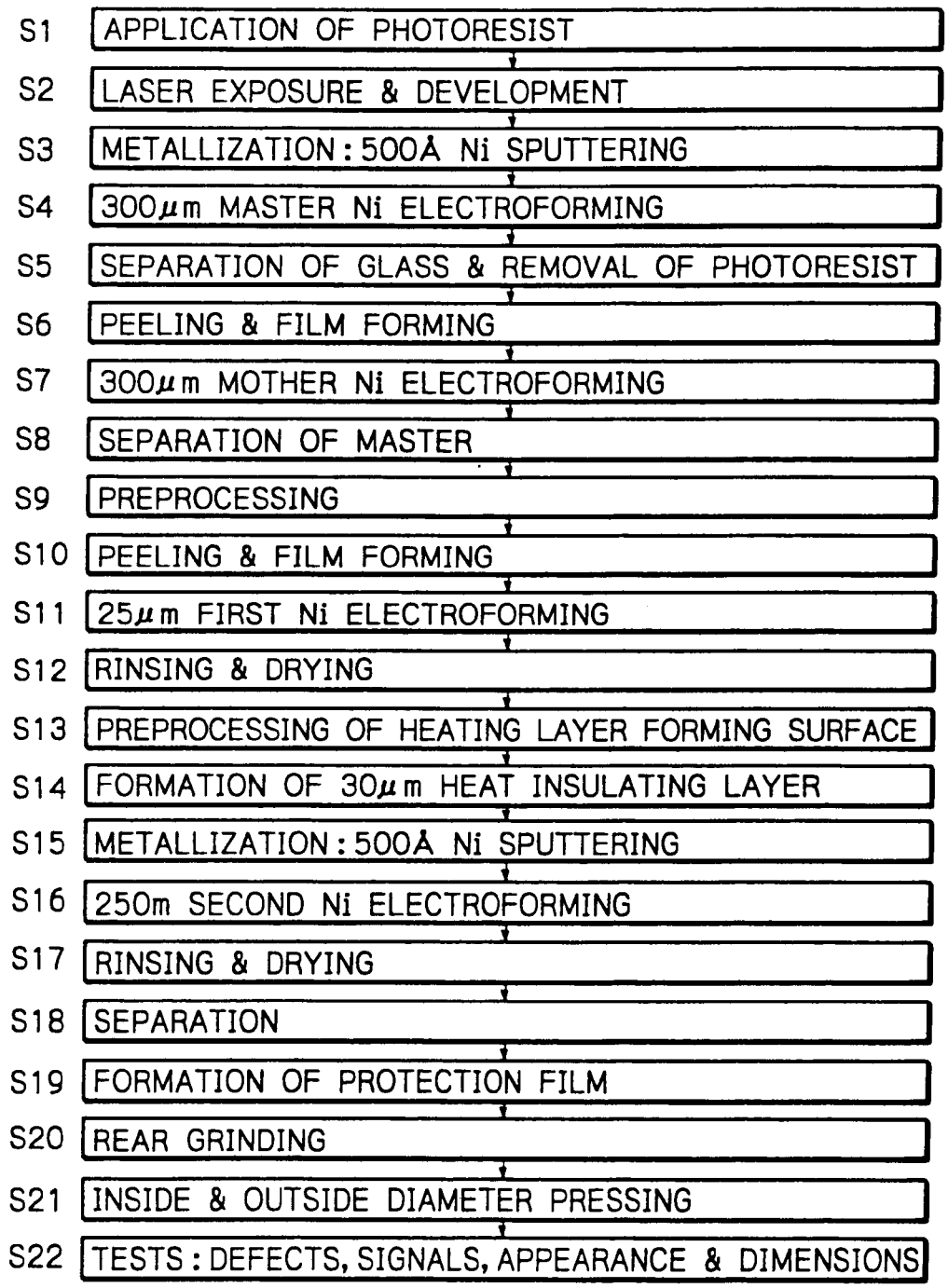
FIG. 4 is a flowchart showing a procedure for producing a stamper or heat-insulated son stamper available with the first embodiment.
Figure 5A:
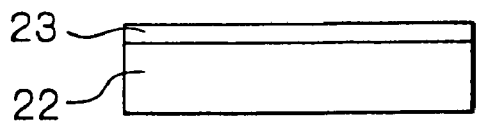
FIGS. 5A through 5N are side elevations showing a sequence of steps corresponding to the flowchart of FIG. 4.
Figure 5B:
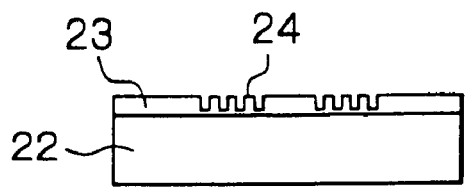
Figure 5C:
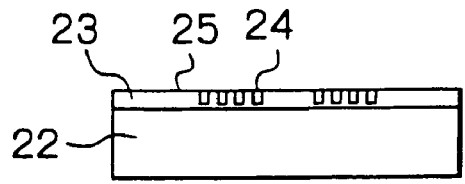
Figure 5D:
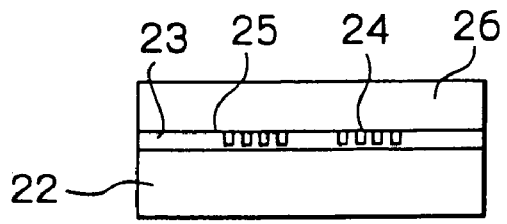
Figure 5E:
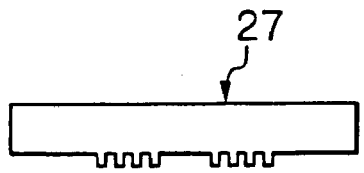

Next, a heat-insulated son stamper and a method of producing it will be described with reference to FIGS. 4, 5A through 5N and 6. FIG. 4 demonstrates a sequence of steps for producing a heat-insulated son stamper 21. First, a photoresist layer 23 is formed on a glass master 22 (step S1; FIG. 5A) and then exposed by a laser beam and developed to form a pattern of fine projections and recesses 24 constituting a surface transfer surface pattern (step S2; FIG. 5B). An electroconductive film 25 is formed on the pattern 24 (step S3; FIG. 5B). Subsequently, Ni electroforming is effected by using the electroconductive film 25 as a cathode, thereby forming an about 300 $\mu$m thick Ni layer 26 (step S4; FIG. 5D). The Ni layer 26 serves as an Ni electroformed layer and a mater transfer metal layer. The Ni layer 26 is separated from the glass master 22, and then the photoresist 23 remaining on the Ni layer 26 is removed. As a result, a master 27 with the pattern 24 is produced (step S5; FIG. 5E).

Figure 5F:
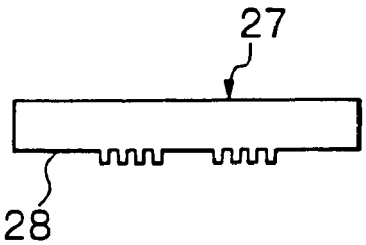
Figure 5G:
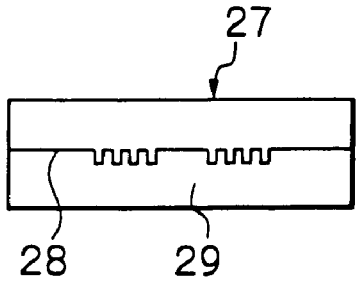
Figure 5H:
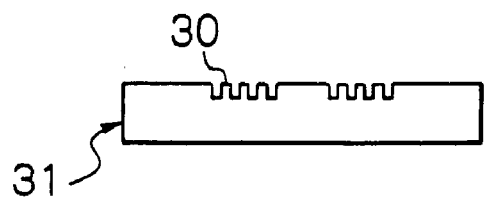

After the separation of the above master 27 (step S6; FIG. 5F), an Ni oxide film 28 and an about 300 $\mu$m thick second Ni layer 29 are sequentially formed (step S7; FIG. 5G). The second Ni layer 29 plays the role of a mother transfer metallic layer. Subsequently, the Ni layer 29 is separated from the master 27. As a result, a mother 31 is obtained and has an inverted transfer surface pattern 30 to which pattern 24 is transferred (step S8; FIG. 5H).

Figure 5I:
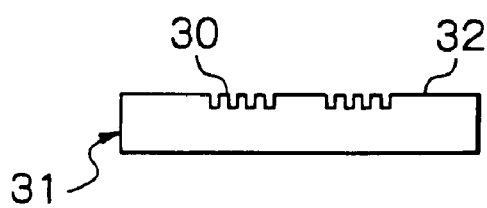
Figure 5J:
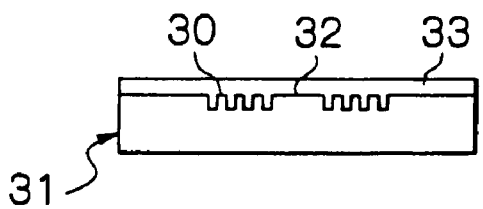
Figure 5K:
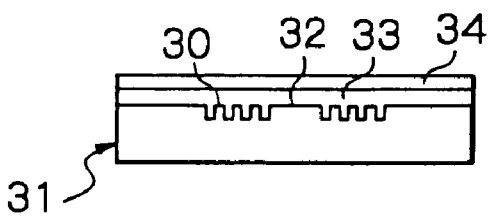

After preprocessing (step S9), the mother 31 is peeled off and then formed with an Ni oxide film 32 like the master 27 (step S10; FIG. 5I). Then, an about 25 $\mu$m thick Ni layer 33 is formed by electroforming (step S11; FIG. 5J). This Ni layer 33 serves as an Ni electroformed layer and a son transfer metallic layer. Subsequently, after rinsing and drying (step S12) and the following preprocessing for forming an insulating layer (step S13), an insulating layer 34 playing the role of a son heat insulating layer is formed on the Ni layer 33 and implemented by a heat resistant polymer (step S14; FIG. 5K). As for the method of forming the heat insulating layer 34 on the Ni layer 33 and the kind of the layer 34, the above procedure is identical with the previous procedure described in relation to the master stamper 1.

Figure 5L:
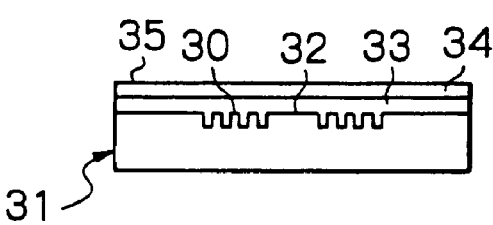
Figure 5M:
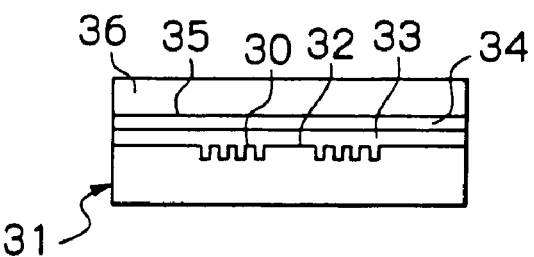
Figure 5N:
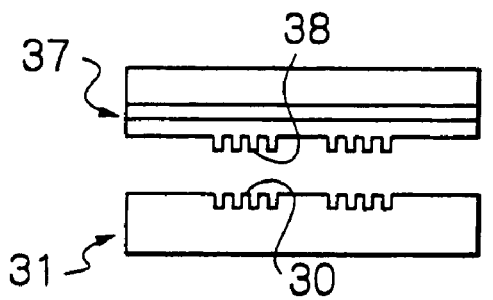

After the formation of the heat insulating layer 34, an electroconductive film 35 is formed on the layer 34 (step S15; FIG. 5L). Then, Ni electroforming is effected by using the electroconductive film 35 as a cathode, thereby forming an Ni layer 36 (step S16; FIG. 5M). This is followed by rinsing and drying (step S17). Thereafter, the laminate formed on the mother 31 and made up of the Ni layer 33, heat insulating layer 34 and Ni layer 36 is separated from the mother 31 to constitute a heat-insulated son stamper blank 37 (step S18; FIG. 5N). The son stamper blank 37 is subjected to coating with a protection film (step S19), rear surface grinding (step S29), inside and outside diameter pressing (step S21), and signal and defect tests (step S22). As a result, the heat-insulated son stamper 21 is obtained and has a transfer surface 38 to which the inverted transfer surface pattern 30 of the mother 31 is transferred.

Figure 6:
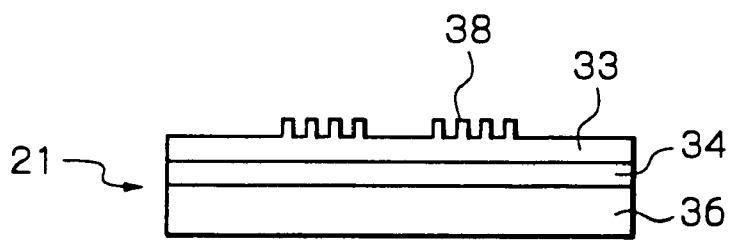
FIG. 6 is a side elevation showing part of the heat-insulated son stamper.

FIG. 6 shows part of the above heat-insulated son stamper 21. As shown, the son stamper 21 is made up of the Ni layer 33, heat insulating layer 34 and Ni layer 36 and has the transfer surface 38 on its front.

An optical disk base and a method of producing the same will be described hereinafter. To produce an optical disk base with the above heat-insulated master stamper 1 or the heat-insulated son stamper 21, conventional injection molding is used. Specifically, the master stamper 1 or the son stamper 21 is fixed in place in a cavity formed by a pair of mold parts. Molten resin, not shown, is injected into the cavity and then cooled off. Subsequently, the mold parts are separated in order to remove the cooled resin and produce an optical disk base. A procedure beginning with the exposure of a master and ending with the packaging and shipment will be described specifically later.

Experiments were conducted by maintaining a mold at a temperature 10° C. to 20° C. lower than the usual temperature and varying the thickness of the polyimide heat insulating layer 7 or 34 to 5 $\mu$m, 20 $\mu$m, 50 $\mu$m, 150 $\mu$m and 250 $\mu$m. When the polyimide layer 7 or 34 was 5 $\mu$m thick or above, both the sufficient transferability and improved tact of a disk base molding cycle were achieved at a high level. When the polyimide layer 7 or 34 was 250 $\mu$m thick or above, the disk base molding cycle was lower in tact than the conventional cycle although transferability was acceptable. This was ascribable to the fact that the temperature of the surface portion of the molten resin (stamper transfer portion) was excessively high just after the injection of the molten resin into the cavity, extending a period of time necessary for the resin to the cooled off to its thermal deformation temperature.

Figure 7:
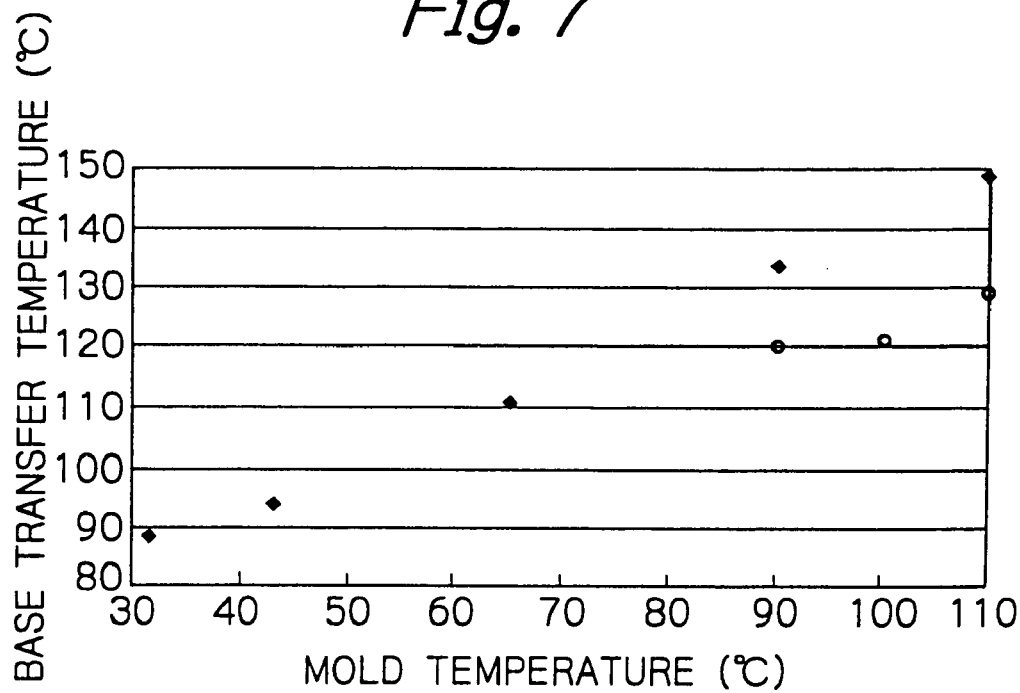
FIG. 7 is a graph comparing the illustrative embodiment and prior art with respect to a relation between mold temperature and base transfer temperature.

FIG. 7 is a graph comparing a conventional method and the illustrative embodiment with respect to a relation between the mold temperature and the base transfer temperature and determined by simulation. In FIG. 4, dots and circles show the result of conventional method and the result of the illustrative embodiment, respectively. The conventional method is taught in Japanese Patent Laid-Open Publication No. 7-178774 mentioned earlier. As FIG. 7 indicates, the conventional method causes the base transfer temperature to noticeably vary in accordance with the variation of the mold temperature. By contrast, the illustrative embodiment causes the base transfer temperature to vary little despite the variation of the mold temperature, i.e., reduces the dependency of the base transfer temperature on the mold temperature. It is therefore possible to maintain the base transfer temperature high while lowering the mold temperature to a sufficient degree. FIG. 7 therefore also proves that both the sufficient transferability and improved tact of the disk base molding cycle are achievable at a high level.

If desired, the heat insulating layer 7 or 34 may be implemented by zirconia or similar ceramic. In such a case, the heat insulating layer 7 or 34 can be easily formed by effecting, e.g., the flame spraying, plasma jet or ion plating of the material 7 or 34 on the deposited surface of the electroconductive film 5 or 25 constituting the Ni layer. The heat insulating layer 7 or 34 implemented by a ceramic insures sufficient transferability and improved tact of the disk forming cycle if it is 50 μm thick or above. As for a ceramic, the maximum thickness of the heat insulating layer 7 or 34 should preferably be 300 μm or less.

Further, the heat insulating layer 7 or 34 may even be implemented by metal, e.g., Bi (bismuth). In this case, the layer 7 or 34 can be easily formed by electroplating the deposited surface of the electroconductive film 5 or 25 with Bi. The heat insulating layer 7 or 34 implemented by Bi insures sufficient transferability and improved tact of the disk base forming cycle if it is 150 μm thick or above. As for Bi, too, the maximum thickness of the heat insulating layer 7 or 34 should preferably be 300 μm or less. Further, Bi resembles Ni as to the coefficient of linear expansion. This obviates expansion and warp ascribable to bimetal despite temperature elevation due to the molten resin and the cooling of the mold, thereby enhancing transferability. In addition, Bi that can be deposited by electroplating allows the heat insulating layer 7 or 34 to have any desired thickness.

Figure 8:
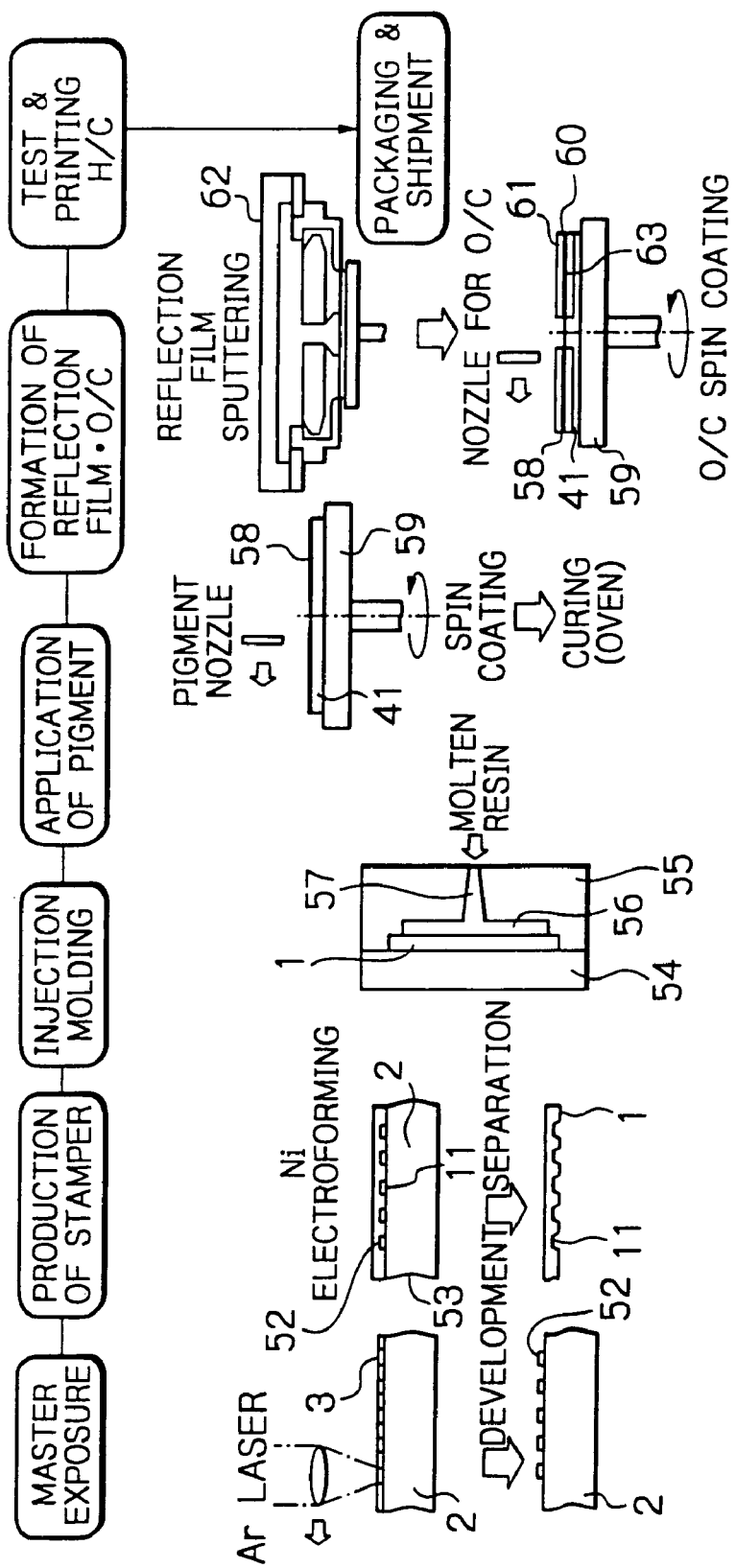
FIG. 8 shows a sequence beginning with the exposure of a master and ending with packaging and shipment.

As for an optical disk and a method of producing the same, reference will be made to FIG. 8 for describing a procedure beginning with the exposure of a master and ending with packaging and shipment. Let the following description concentrate on a CD-R 51 shown in FIG. 9. The CD-R 51 is an optical disk including an optical disk base 41 molded by use of the heat-insulated master stamper 1.

First, at a master exposure stage, a pregroove pattern 52 corresponding to the previously stated pattern of fine projections and recesses 4 is formed in the glass master 2, thereby forming a master 53. Specifically, the photoresist layer 3 is formed on the glass master 2 and then exposed by an Ar (argon) laser beam and developed to form the pregroove pattern 52. The pregroove pattern 52 is necessary to form the Ni electroformed layer 6 of the heat-insulated master stamper 1 (see FIG. 2A).

Next, a stamper is produced by the following steps. After the electroconductive film 5 has been formed on the pregroove pattern 52, Ni electroforming is effected by using the electroconductive film 5 as a cathode, thereby forming the about 25 μm thick Ni layer 6 (see FIG. 2B). The Ni layer 6 has on its entire surface the transfer surface 11 to which the pregroove pattern 52 is transferred. After the heat insulating layer 7 and second Ni layer 9 have been laminated on the Ni layer 6, the Ni layer 6, insulating layer 7 and Ni layer 9 are separated from the glass master 2. As a result, the heat-insulated master stamper 1 is formed (see FIG. 3).

Subsequently, the optical disk base 41 is formed by injection molding, as follows. After the stamper 1 has been fixed in place in a cavity 56 formed between a stationary mold part 54 and a movable mold part 55, molten resin, not shown, is injected into the cavity 56 via a nozzle 57 formed in the movable mold part 55. Then, the molten resin is compressed between the two mold parts 54 and 55. Subsequently, the mold parts 54 and 55 are separated from each other in order to remove the cooled and solidified resin, i.e., optical disk base 41. For the optical disk base 41, use may be made of any one of various stampers including the heat-insulated master stamper 1 and son stamper 21 stated earlier.

Figure 9:
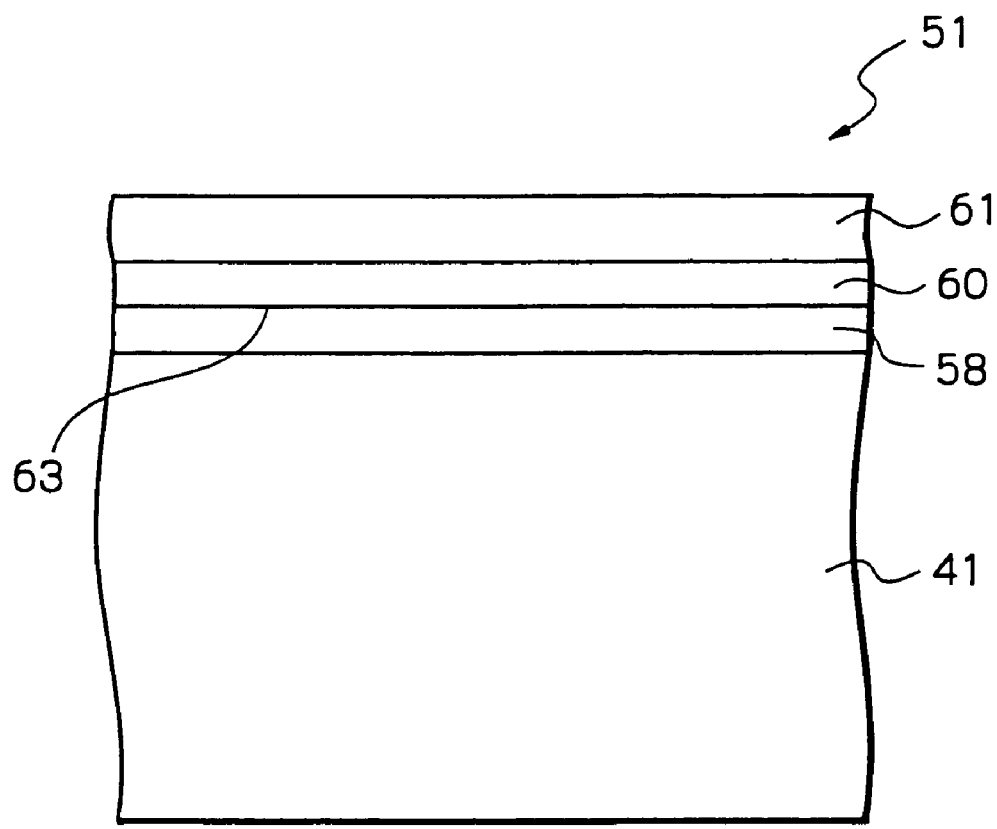
FIG. 9 is a sectional side elevation of an optical disk (recordable CD or CD-R)

The above optical disk base 41 is coated with a pigment or recording material in order to form a light absorption layer 58 (see FIG. 9). Specifically, after the optical disk base 58 has been positioned on a turntable 59, it is coated with a 3.5 wt % dimethylcyclohexane solution of Pd phthalocyanine having a single 1-isopropyl-isoamyloxy radical at the α position of each of four benzene rings constituting phthalocyanine. Subsequently, the turntable 59 is turned to effect spin coating at a speed of 2,000 rpm (revolutions per minute). Then, the base 41 is dried at 70° C. for 2 hours (curing in an oven) so as to form the light absorption layer 58 which is 100 nm thick.

Subsequently, a reflection layer 60 and a protection layer 61 are sequentially formed, as follows (see FIG. 6). While the base 41 with the light absorption layer 58 is held on the turntable 59, a sputtering device 58 with a silver target mounted thereon forms a silver reflection layer 60 on the light absorption layer 58 to a thickness of 100 nm. As a result, the base 41 is provided with a light reflection surface 63. Further, after ultraviolet-setting resin has been deposited on the reflection layer 60 by spin coating, ultraviolet rays are radiated toward the reflection layer 60 in order to form a 6 μm thick protection layer 61.

Thereafter, the signal characteristic and mechanical characteristic of the media are tested, and labels are printed only on the acceptable media by screen printing. The media with the labels each are subjected to hard coating to complete the CD-R or optical disk 51. FIG. 9 is a section showing the completed CD-R 51. Such CD-Rs 51 will be packaged and shipped later.

The above illustrative embodiment has various unprecedented advantages, as enumerated below.

(1) A stamper includes a heat insulating layer extending in parallel to, but not contacting, a transfer surface used to form a disk base. Therefore, at the time of injection molding using the stamper, even when a mold having mold temperature lower than conventional is used, resin contacting the stamper remains at high temperature and insures sufficient transferability. It follows that desirable transferability is achievable at high transfer temperature, and in addition the tact of a disk base molding cycle is improved at low mold temperature.

(2) The heat insulating layer has thermal conductivity lower than 94 W/m. k, i.e., lower than the thermal conductivity of Ni customarily used for a mold. The heat insulating layer can therefore exhibit a heat insulating effect.

(3) The heat insulating layer is formed of a heat resistant organic polymer. This, coupled with the low thermal conductivity of the heat insulating layer, prevents a surface portion (stamper transfer portion) from being sharply cooled off. Molten resin is therefore free from noticeable skin layer and insures desirable transferability.

(4) For the heat resistant organic polymer, use is made of polyimide. It is therefore possible to provide the heat insulating layer with any desired thickness by using a polyimide acid that is a precursor of polyimide.

(5) The above polyimide has a thickness ranging from 5 μm to 150 μm and therefore an adequate degree of insulating ability. This allows both the sufficient transferability and improvement in the tact of the optical disk base molding cycle to be achieved at the same time.

(6) For the heat resistant organic polymer, use is made of polyimideamide. It is therefore possible to provide the heat insulating layer with any desired thickness by using a polyamide acid that is a precursor of polyamideimide.

(7) The above polyamideimide has a thickness ranging from 5 μm to 150 μm and therefore an adequate degree of insulating ability. This allows both the sufficient transferability and improvement in the tact of the optical disk base molding cycle to be achieved at the same time.

(8) The heat insulating layer is formed of a heat resistant inorganic polymer. This, coupled with the low thermal conductivity of the heat insulating layer, prevents a surface portion (stamper transfer portion) from being sharply cooled. Molten resin is therefore free from a noticeable skin layer and insures desirable transferability.

(9) When the heat resistant inorganic polymer is implemented by a ceramic, the heat insulating layer can be easily formed by flame spraying, plasma jet, ion plating or similar technology.

(10) The above ceramic has a thickness ranging from 50 μm to 300 μm and therefore an adequate degree of insulating ability. This allows both the sufficient transferability and improvement in the tact of the optical disk base forming cycle to be achieved at the same time.

(11) The heat insulating layer is formed of metal. This, coupled with the low thermal conductivity of the heat insulating layer, prevents a surface portion (stamper transfer portion) from being sharply cooled off. Molten resin is therefore free from a noticeable skin layer and insures desirable transferability.

(12) The metal resembles Ni customarily used for a stamper in the coefficient of linear expansion. This obviates expansion and warp ascribable to bimetal despite temperature elevation due to the molten resin and the cooling of the mold, thereby enhancing transferability.

(13) In addition, the metal Bi that can be deposited by electroplating allows the heat insulating layer to have any desirable thickness.

(14) The above Bi has a thickness ranging from 150 μm to 300 μm and therefore an adequate degree of insulating ability. This allows both the sufficient transferability and improvement in the tact of the optical disk base forming cycle to be achieved at the same time.

(15) The illustrative embodiment produces a stamper for molding an optical disk base by forming on a photoresist master having a transfer surface pattern an Ni layer having a transfer surface to which the transfer surface pattern is transferred by electroforming, forming an insulating layer on the Ni layer, and separating the photoresist master from the Ni layer. Therefore, at the time of injection molding using the stamper, even when a mold having mold temperature lower than conventional is used, resin contacting the stamper remains at high temperature and insures sufficient transferability. It follows that desirable transferability is achievable at high transfer temperature, and in addition the tact of a disk base forming cycle is improved at low mold temperature.

(16) The illustrative embodiment produces a stamper for molding an optical disk base by forming on a mother stamper having a transfer surface pattern an Ni layer having a transfer surface to which the transfer surface pattern is transferred by electroforming, forming an insulating layer on the Ni layer, and separating the mother stamper from the Ni layer. Therefore, at the time of injection molding using the stamper, even when a mold having mold temperature lower than conventional is used, resin contacting the stamper remains at high temperature and insures sufficient transferability. It follows that desirable transferability is achievable at high transfer temperature, and in addition the tact of a disk base molding cycle is improved at low mold temperature.

(17) After the insulating layer has been formed on the Ni layer, a second Ni layer is formed on the insulating layer by electroforming. This successfully increases the mechanical strength of the stamper.

(18) With any one of the above methods, it is also possible to achieve the previously stated advantages (1) through (14).

(19) The illustrative embodiment produces a stamper for molding an optical disk base by depositing photoresist on a glass master, forming a transfer surface pattern of fine projections and recesses by laser exposure and development, forming a master transfer metal layer by electroforming after the metallization of the surface having the above pattern, forming a master insulating layer on the metal layer, forming a master metal layer on the master insulating layer, separating the glass master, and removing the photoresist. Therefore, at the time of injection molding using the stamper, even when a mold having mold temperature lower than conventional is used, resin contacting the stamper remains at high temperature and insures sufficient transferability. It follows that desirable transferability is achievable at high transfer temperature, and in addition the tact of a disk base forming cycle is improved at low mold temperature.

(20) In the above procedure, the master transfer metal layer and master metal layer are formed of Ni. Therefore, the master transfer metal layer and master metal layer can be easily laminated by Ni electroforming. In addition, the thickness of each layer can be readily controlled.

(21) The master transfer metal layer is 100 μm to 25 μm thick and provides the stamper with an adequate heat insulting effect.

(22) The master transfer metal layer is 25 μm to 5 μm thick and provides the stamper with an adequate heat insulating effect.

(23) The illustrative embodiment produces a stamper for molding an optical disk base by depositing photoresist on a glass master, forming a transfer surface pattern of fine projections and recesses by laser exposure and development, forming a master transfer metal layer by electroforming after the metallization of the surface having the above pattern, separating the glass master, removing the photoresist to thereby form a master, peeling off the surface of the master formed with the above pattern, forming a mother transfer metal layer by electroforming to thereby form a mother having an inverted transfer surface pattern which is an inverted form of the transfer surface pattern, peeling off the inverted transfer surface-pattern of the mother, sequentially forming a son transfer metal layer having a transfer surface pattern to which the inverted transfer pattern is transferred, a son insulating layer and a son metal layer, and separating the mother to thereby form a son stamper. Therefore, at the time of injection molding using the stamper, even when a mold having mold temperature lower than conventional is used, resin contacting the stamper remains at high temperature and insures sufficient transferability. It follows that desirable transferability is achievable at high transfer temperature, and in addition the tact of a disk base forming cycle is improved at low mold temperature.

(24) In the above procedure, the master transfer metal layer, mother transfer metal layer, son transfer metal layer, master metal layer and son metal layer are formed of Ni. Therefore, the master transfer metal layer and master metal layer can be easily laminated by Ni electroforming. In addition, the thickness of each layer can be readily controlled.

(25) With the above procedure, it is also possible to achieve the previously stated advantages (21) and (22).

(26) The illustrative embodiment produces an optical disk base by injecting molten resin into a cavity formed between a pair of mold parts and accommodating any one of the above stampers, and separating the mold parts in order to remove the cooled resin. Therefore, at the time of injection molding using the stamper, even when a mold having mold temperature lower than conventional is used; resin contacting the stamper remains at high temperature and insures sufficient transferability. It follows that desirable transferability is achievable at high transfer temperature, and in addition the tact of a disk base forming cycle is improved at low mold temperature.

(27) The illustrative embodiment produces an optical disk by injecting molten resin into a cavity formed between a pair of mold parts and accommodating any one of the above stampers, separating the mold parts in order to remove the cooled resin, coating the transfer surface of the resin with a recording material to thereby form a light absorption layer, and forming a reflection film on the light absorption layer. Therefore, at the time of production of an optical disk base, even when a mold having mold temperature lower than conventional is used, resin contacting the stamper remains at high temperature and insures sufficient transferability. It follows that desirable transferability is achievable at high transfer temperature, and in addition the tact of a disk base forming cycle is improved at low mold temperature.

(28) The optical disk base of the illustrative embodiment is produced by the above method. Therefore, at the time of production of an optical disk base, even when a mold having mold temperature lower than conventional is used, resin contacting the stamper remains at high temperature and insures sufficient transferability. It follows that desirable transferability is achievable at high transfer temperature, and therefore a high quality optical disk is achievable because of the desirable signal characteristic of the optical disk base.

(29) The optical disk of the illustrative embodiment is produced by the above method. Therefore, at the time of production of an optical disk base, even when a mold having mold temperature lower than conventional is used, resin contacting the stamper remains at high temperature and insures sufficient transferability. It follows that desirable transferability is achievable at high transfer temperature, and therefore a high quality optical disk is achievable because of the desirable signal characteristic of the optical disk base.

2nd Embodiment

Figure 10A:
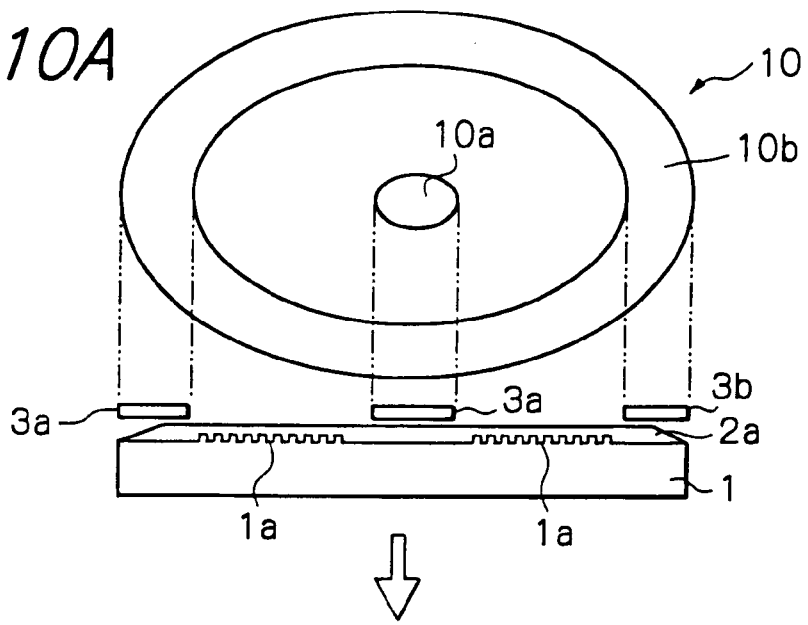
FIGS. 10A–10D are side elevations showing an alternative embodiment of the present invention which pertains to a stamper.

Referring to FIGS. 10A through 10D, an alternative embodiment of the present invention that pertains to the production of a stamper will be described. First, how a mother 1 shown in FIG. 10A is formed before the sequence of steps shown in FIGS. 10A through 10D will be described. After an electroconductive film has been formed on a pattern of fine projections and recesses formed on a glass master, an Ni layer is formed by electroforming by using the electroconductive film as a cathode. Then, the glass master is separated to produce a master. After the master has been peeled off, an Ni layer is formed by electroforming and then separated from the master in order to produce the mother 1 having an inverted projection and recess pattern 1a.

After the mother 1 has been subjected to peeling and film forming like the master (not shown specifically), an about 25 μm thick Ni layer 2a is formed on the mother 1 by electroforming, as shown in FIG. 10A. In FIG. 10A, the reference numeral 10 designates a master obtained at the end of the procedure to be described; a general positional relation between masks formed on the Ni layer 2a and the recording area of the stamper 10 is shown.

Figure 10B:
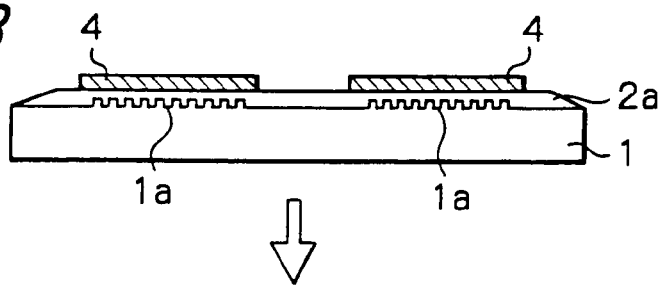

As shown in FIG. 10A, masks 3a and 3b implemented by Teflon (polytetrafluoroethylene or PTFE) are respectively formed in the regions of the Ni layer 2a corresponding to the region 10a of the stamper 10 5 mm inward of the innermost circumference of the recording area and the region 10b of the stamper 10 between a position 5 mm outward of the outermost circumference of the recording area and the edge. The Ni layer 2a is coated with a partially-imidized straight chain type polyamide acid solution (e.g. Torenese #3000 available from Toray Industries Inc. by spin coating or spray coating. The coated polyamide acid solution is then subjected to cyclodehydration with the application of heat thereto to imidize the coated polyamide acid solution. As a result, a polyimide heat insulation layer 4 is formed, as shown in FIG. 10B.

Figure 10C:
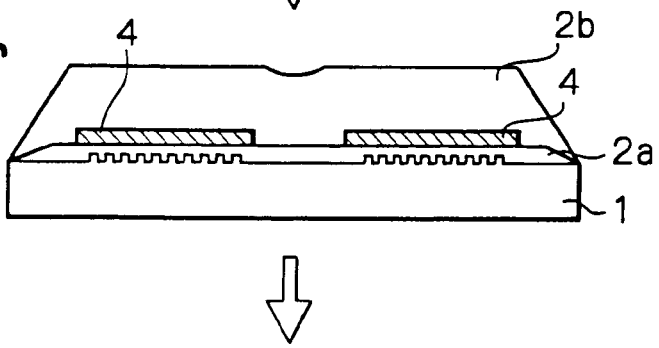
Figure 10D:
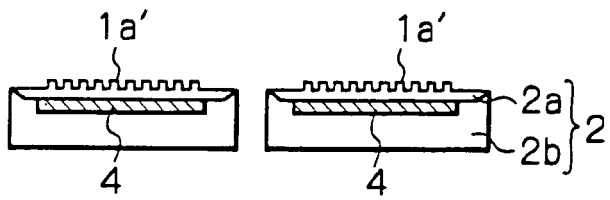

After the masks 3a and 3b have been removed from the above laminate, an electroconductive film, not shown, is formed. Subsequently, as shown in FIG. 10C, an Ni layer 2b is formed by electroforming by using the electroconductive film as a cathode. The Ni layers 2a and 2b have a total thickness of 300 μm. The nickel layers 2a and 2b including the polyimide heat insulating layer 4 are separated from the mother 1 to thereby form a stamper 10 for molding an optical disk base, as shown in FIG. 10D. The stamper 10 has a pattern of fine projections and recesses 1a' that is opposite to the pattern 1a of the mother 1.

After the above stamper 10 has been set on an injection molding machine, molten resin is injected into the machine in order to mold an optical disk base. At this instant, a mold temperature 10° C. to 20° C. lower than the conventional mold temperature is selected. The thickness of the polyimide heat insulating layer 4 was varied to 20 μm, 50 μm, 150 μm and 250 μm. When the polyimide layer 4 was 20 μm thick or above, both of sufficient transferability and improved tact of a disk base forming cycle were achieved at a high level. When the polyimide layer 4 was 250 μm thick or above, the disk base forming cycle was lower in tact than the conventional cycle although transferability was acceptable. This was ascribable to the fact that the temperature of the surface portion of the molten resin (stamper transfer portion) was excessively high just after the injection of the molten resin into the cavity, extending a period of time necessary for the resin to the cooled off to its thermal deformation temperature.

If desired, the heat insulating layer 4 may be implemented by zirconia or similar ceramic. In such a case, the heat insulating layer 4 can be easily formed by effecting, e.g., the flame spraying, plasma jet or ion plating of the material 4 on the Ni layer 2a. The thickness of the heat insulating layer 4 was varied to 20 μm, 50 m, 100 μm, 150 μm and 250 μm. The heat insulating layer 4 implemented by a ceramic insures sufficient transferability and improved tact of the disk forming cycle if it is 100 μm thick or above.

Further, the heat insulating layer 4 may even be implemented by metal, e.g., Bi. In this case, the layer 4 can be easily formed by electroplating the Ni layer 2a with Bi. The thickness of the heat insulating layer 4 was varied to 50 μm, 150 μm and 250 μm. The heat insulating layer 4 implemented by Bi insures sufficient transferability and improved tact of the disk base forming cycle if it is 250 μm thick or above.

For comparison, a stamper for optical disk base was produced in the same manner as in the illustrative embodiment except that it was entirely implemented by Ni without the heat insulating layer. When an optical disk base was formed by use of such a comparative stamper, the fine projection and recess pattern of the stamper was not satisfactorily transferred to the disk base, degrading the signal characteristic of the resulting optical disk.

The above embodiment and modifications thereof have the following advantages.

(1) Only the recording area of a stamper is provided with a heat insulating effect and insures sufficient transferability. This successfully reduces the cooling time up to the time when a base is removed from a mold.

(2) The edges of the stamper are protected from breakage or peeling during the processing of the inside and outside diameters of the stamper. This prevents an Ni layer and a heat insulating layer from being separated even during quantity production.

(3) Molten resin is prevented from being sharply cooled off just after the injection, so that the transferability of the fine projection and recess pattern of the stamper is enhanced.

(4) The inherently low thermal conductivity of the material exhibits a heat insulating effect and implements both the sufficient transferability and improved tact of the base molding cycle.

(5) Polyimide and polyamideimide heat insulating layers having various thicknesses are achievable with a polyamide acid that is a precursor.

(6) A particular thickness of the heat insulating layer implementing both the sufficient transferability and improved tact of the base molding cycle can be defined.

(7) The heat insulating layer can be readily formed by flame spraying, plasma jet, ion plating or similar technology.

(8) There can be obviated expansion, contraction and warp ascribable to bimetal between the heat insulating material and Ni that is the major component of the stamper.

(9) When use is made of a heat insulating material to which electroplating is applicable, the thickness of the heat insulating layer can be controlled.

(10) The recording area of the stamper is selectively heat-insulated. The stamper therefore realizes both the sufficient transferability and improved tact of the disk base molding cycle.

(11) A method capable of producing optical disk bases on a quantity basis is achievable while implementing both the sufficient transferability and improved tact of the disk base molding cycle.

3rd Embodiment

This embodiment is substantially identical with the first embodiment as to the heat-insulated stamper or son stamper, a method of producing it, an optical disk base, and a method of producing it. The following description will therefore concentrate on differences between this embodiment and the first embodiment.

Figure 11:
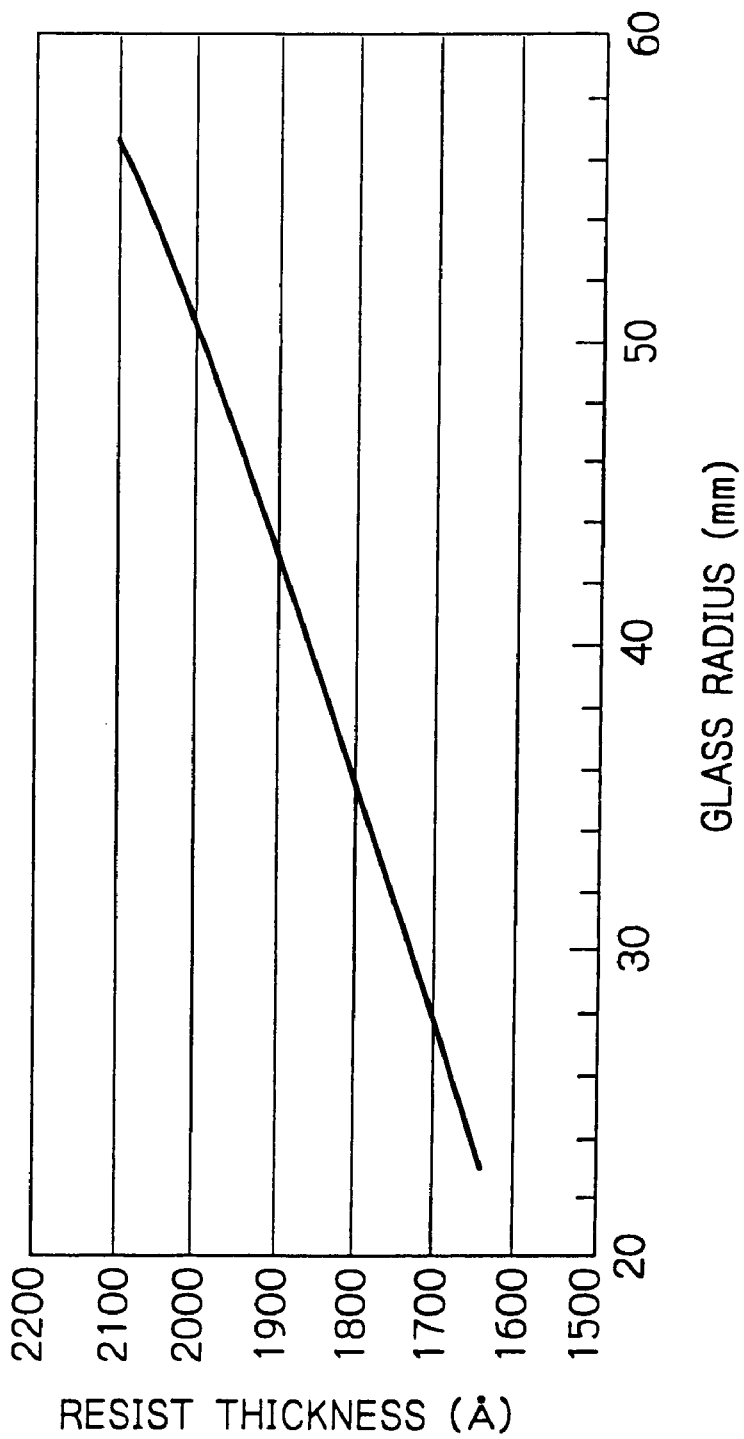
FIG. 11 shows a relation between the radius of a glass master and the thickness of photoresist to be applied to the glass master.
Figure 12:
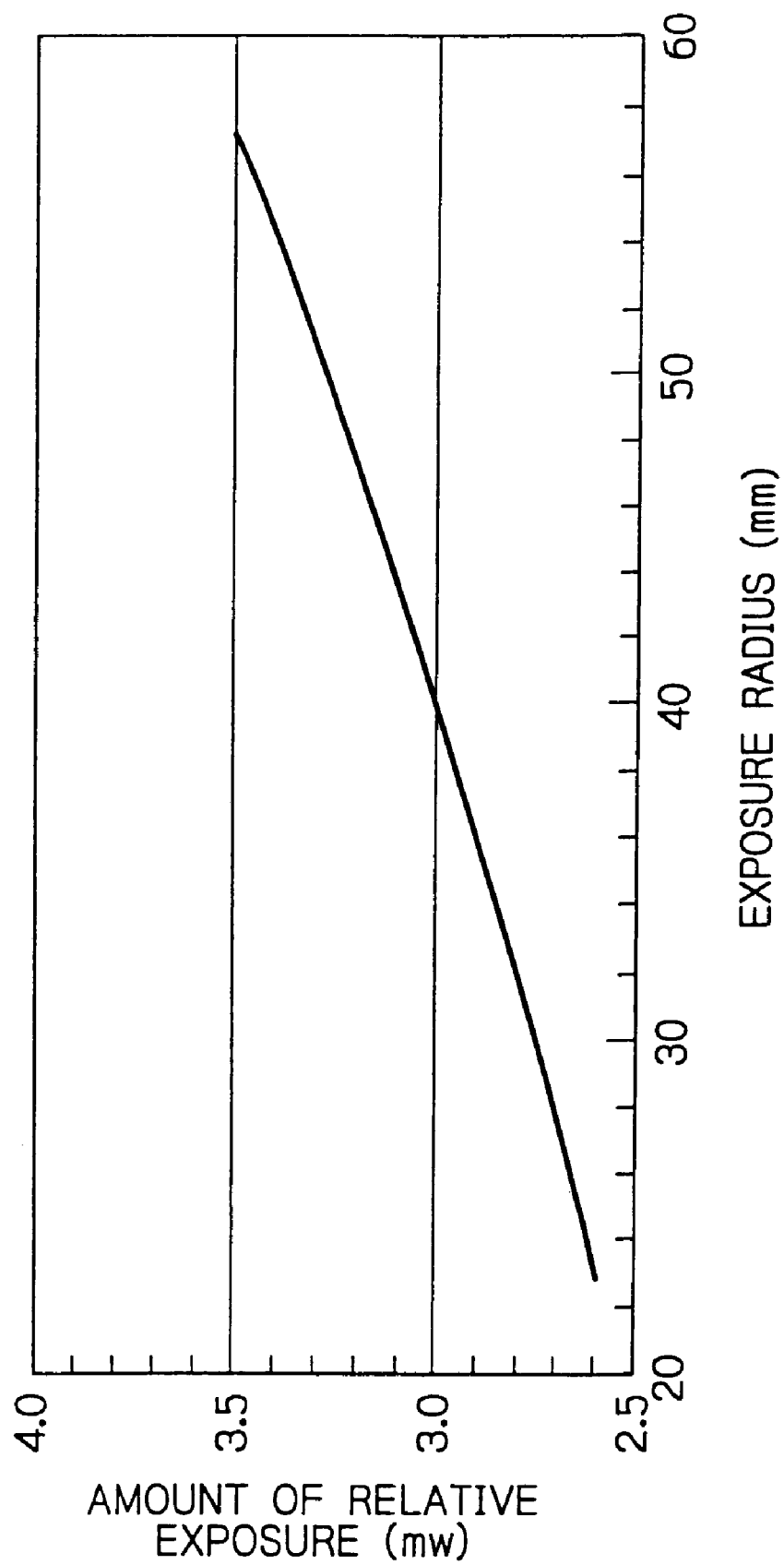
FIG. 12 shows a relation between the exposure radius of a laser beam and relative exposure intensity.
Figure 13A:
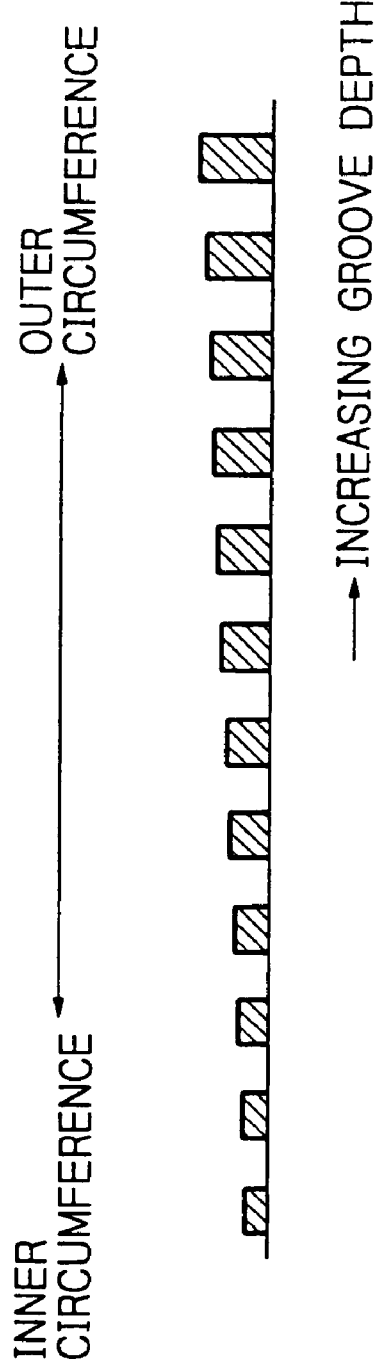
FIGS. 13A and 13B each show a particular configuration of guide grooves.

As shown in FIG. 11, photoresist is applied to a glass master 2 such that its thickness sequentially increases from the inner circumference toward the outer circumference. Then, the photoresist is exposed to a guide groove pattern by a laser beam over a range of 22.35 mm to 59 mm from the center of the glass base 2. At this instant, as shown in FIG. 12, the relative intensity of the laser beam is sequentially increased from the inner circumference toward the outer circumference of the glass master 2. After the exposure, the pattern was developed to form guide grooves shown in FIG. 13A in the glass master 2. As shown, the guide grooves have depths sequentially increasing from the inner circumference toward the outer circumference. The illustrative embodiment was extremely effective when the outermost guide groove had a depth greater than the depth of the innermost groove by 50 Å to 500 Å, particularly by 100 Å to 300 Å. Of course, curves shown in FIGS. 11 and 12 are only illustrative and may be modified in various ways.

Figure 13B:
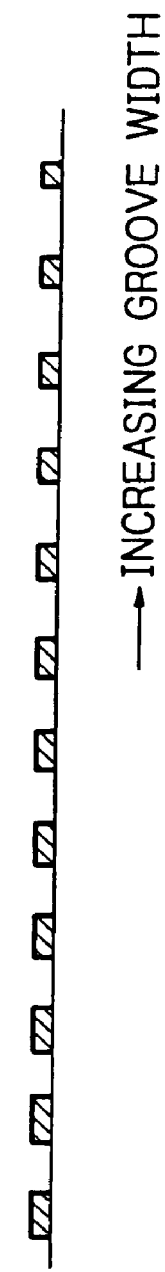

Alternatively, as shown in FIG. 13B, the guide grooves may have their width sequentially increased form the inner circumference toward the outer circumference. The illustrative embodiment achieved a desirable effect when the outermost guide groove had a width greater than the width of the innermost guide groove by 0.02 μm to 0.1 μm. If desired, both the depths and widths of the guide grooves may be sequentially varied. For example, a desirable effect was achieved when the outermost guide groove was deeper than the innermost guide groove by 100 Å or less and broader than the innermost guide groove by 0.05 μm or less.

The glass master 2 with the fine projection and recess pattern 4 sequentially varying in configuration, as stated above, serves as a master.

In the illustrative embodiment, at the time of formation of the heat insulating layer 34 shown in the step S14 of FIG. 4 and in FIG. 5K, masks implemented by Teflon are respectively formed in the regions of the Ni layer 33 corresponding to the region of the recording area 5 mm inward of the innermost circumference and the region of the same between a position 5 mm outward of the outermost circumference and the edge. Subsequently, a heat insulating layer or son heat insulating layer 34 is formed on the Ni layer 33 by use of a heat resistant polymer.

Further, in the illustrative embodiment, the signal characteristic and mechanical characteristic of the resulting optical disks were measured. Specifically, information was written in the recording area between a diameter of 44.7 mm and a diameter of 118 mm and then read out by a semiconductor laser beam having a wavelength of 782 nm, NA of 0.47 and power of 0.5 mW at a liner velocity of 1.3 m/s. During reproduction, a reflectance, a radial contract signal and a push-pull signal were measured. The measurement showed that all of the above three factors were evenly distributed over the entire disk surface. Moreover, the optical disks were satisfactorily compatible with various CD players available on the market.

For comparison, when a stamper for an optical disk base was entirely implemented by Ni and used to produce a disk base, the guide groove pattern of the stamper was not sufficient transferred to the disk base, degrading the signal characteristic of the resulting optical disk.

Further, when a disk base was formed in the same manner as in the first embodiment except that the photoresist had a uniform thickness and that the laser beam had constant intensity. Although this comparative example implemented sufficient transferability of the guide groove pattern, it was apt to cause the recording layer to fill up the guide grooves in the outer peripheral portion, also degrading the signal characteristic of the resulting optical disk.

4th Embodiment

In this embodiment, an optical disk base is formed in the same manner as in the third embodiment except that the heat insulating layer is implemented by zirconia or similar ceramic. Ceramics can be easily deposited by effecting, e.g., the flame spraying, plasma jet or ion plating. The thickness of the heat insulating layer was varied to 20 μm, 50 m, 100 μm, 150 μm and 250 μm. The heat insulating layer 4 implemented by a ceramic insures sufficient transferability and improves tact of the disk molding cycle if it is 50 μm thick or above. Experiments were conducted by forming the same layers as in the third embodiment, including the recording layer, on disk bases produced with 100 m, 150 m and 250 m thick stampers. Measurement showed that the reflectance, radial contrast signal and push-pull signal of each disk base was evenly distributed over the entire surface. Moreover, the above disk bases were sufficiently compatible with various CD players available on the market. Presumably, such desirable results are achievable even when the ceramic heat insulating layer is 300 μm thick or less.

The third to fifth embodiments shown and described achieve the following various advantages.

(1) Not only transferability is enhanced at the time of molding, but also the tact of the base molding cycle is improved. When guide grooves have an identical configuration, optical disks sufficiently compatible with commercially available CD players can be produced.

(2) A heat insulating layer extends in parallel to, but not contacting, a transfer surface used to mold a disk base. The configuration of the guide grooves is sequentially varied from the inner circumference toward the outer circumference. Therefore, at the time of injection molding using the stamper, even when a mold having mold temperature lower than conventional is used, resin contacting the stamper remains at high temperature and insures sufficient transferability. It follows that desirable transferability is achievable at high transfer temperature, and in addition the tact of a disk base molding cycle is improved at low mold temperature.

(3) The guide grooves have depths and/or widths thereof sequentially increased from the inner circumference toward the outer circumference. Therefore, when a pigment solution was buried in the guide grooves of the resulting disk base by spin coating, the resulting configuration is substantially uniform in the radial direction.

(4) Use is made of a heat insulating material whose thermal conductivity is lower than 94 W/m. k, i.e., lower than the thermal conductivity of Ni customarily used for a mold. This enhances a heat insulating effect.

(5) A heat resistant polymer having an inherently low thermal conductivity is usable, so that a surface layer portion (stamper transfer portion) can be prevented from being sharply cooled off just after the injection of molten resin. In addition, when the above polymer is implemented by polyimide or polyimideamide, the thickness of the heat insulating material can be easily controlled.

(6) A heat resistant inorganic polymer having an inherently low thermal conductivity is usable, so that a surface layer portion (stamper transfer portion) can be prevented from being sharply cooled off just after the injection of molten resin.

(7) When the heat insulating layer is implemented by a ceramic, it can be easily formed by flame spraying, plasma jet, ion plating or similar technology.

(8) Metal having an inherently low thermal conductivity is usable, so that a surface layer portion (stamper transfer portion) can be prevented from being sharply cooled off just after the injection of molten resin.

(9) Sufficient resistance to heat shocks ascribable to temperature elevation caused by molten resin and cooling of a mold are achievable, facilitating quantity production.

(10) When use is made of Bi, electroplating is usable and allows the thickness of the heat insulating layer to be readily controlled.

(11) The guide grooves have a unique configuration. Therefore, when a pigment solution was buried in the guide grooves of the resulting disk base by spin coating, the resulting configuration is substantially uniform in the radial direction.

Various modifications will become possible for those skilled in the art after receiving the teachings of the present disclosure without departing from the scope thereof.

What is claimed is:

1. A method of producing an optical disk base, comprising:
   injecting molten resin into a cavity formed by a pair of mold parts and accommodating a stamper having a transfer surface for molding the optical disk base and a heat insulating layer extending in parallel to, but not contacting, said transfer surface, wherein said stamper comprises a metallic layer on a side of said heat insulating material opposite to a side facing said transfer surface; and
   separating said pair of mold parts to thereby remove said resin cooled off.

2. A method as recited in claim 1, wherein the optical disk base is formed with at least one of a spiral groove and concentric grooves.

3. A method of producing an optical disk, comprising:
   injecting molten resin into a cavity formed by a pair of mold parts and accommodating a stamper having a transfer surface for molding the optical disk base and a heat insulating layer extending in parallel to, but not contacting, said transfer surface, wherein said stamper comprises a metallic layer on a side of said heat insulating material opposite to a side facing said transfer surface;
   separating said pair of mold parts to thereby remove said resin cooled off;
   coating a transfer surface of said resin with a recording material to thereby form a light absorption layer;
   forming a reflection film on said light absorption film; and
   forming a protection film on said reflection film.

4. A method as recited in claim 3, wherein the optical disk base is formed with at least one of a spiral groove and concentric grooves.

5. An optical disk base produced by a method comprising:
   injecting molten resin into a cavity formed by a pair of mold parts and accommodating a stamper having a transfer surface for molding the optical disk base and a heat insulating layer extending in parallel to, but not contacting, said transfer surface, wherein said stamper comprises a metallic layer on a side of said heat insulating material opposite to a side facing said transfer surface; and
   separating said pair of mold parts to thereby remove said resin cooled off.

6. An optical disk base as recited in claim 5, wherein the optical disk base is formed with at least one of a spiral groove and concentric grooves.

7. An optical disk produced by a method comprising:
   injecting molten resin into a cavity formed by a pair of mold parts and accommodating a stamper having a transfer surface for molding the optical disk base and a heat insulating layer extending in parallel to, but not contacting, said transfer surface, wherein said stamper comprises a metallic layer on a side of said heat insulating material opposite to a side facing said transfer surface;
   separating said pair of mold parts to thereby remove said resin cooled off;
   coating a transfer surface of said resin with a recording material to thereby form a light absorption layer;
   forming a reflection film on said light absorption film; and
   forming a protection film on said reflection film.

8. An optical disk as recited in claim 7, wherein the optical disk base is formed with at least one of a spiral groove and concentric grooves.

9. A method of producing an optical disk base, comprising positioning a heat insulating material beneath a recording area formed on a surface of a stamper for molding an optical disk, wherein said stamper comprises a metallic layer on a side of said heat insulating material.

10. A method as recited in claim 9, wherein the optical disk base is formed with at least one of a spiral groove and concentric grooves.

11. A method of producing an optical disk base, comprising positioning a heat insulating material beneath a recording area formed on a surface of a stamper for molding an optical disk, wherein said heat insulating material is absent around an outer edge and an inner edge of said stamper.

12. A method as claimed in claim 11, wherein said heat insulating material has a thermal conductivity lower than 94 W/m.k.

13. A method as claimed in claim 11, wherein said heat insulating material comprises a heat resistant organic polymer.

14. A method as claimed in claim 13, wherein the heat resistant organic polymer comprises at least one of polyimide and polyamideimide.

15. A method as claimed in claim 14, wherein at least one of the polyimide and polyamideimide has a total thickness of 150 $\mu$m or below.

16. A method as claimed in claim 11, wherein said heat insulating material comprises a heat resistant inorganic polymer.

17. A method as claimed in claim 16, wherein the heat resistant inorganic polymer comprises a ceramic.

18. A method as claimed in claim 17, wherein the ceramic has a thickness of 300 $\mu$m or below.

19. A method as claimed in claim 11, wherein said heat insulating material comprises a metal.

20. A method as claimed in claim 19, wherein the metal is close in a coefficient of linear expansion to Ni used as a stamper material.

21. A method as claimed in claim 19, wherein the metal comprises Bi.

22. A method as claimed in claim 21, wherein the Bi has a thickness of 300 $\mu$m or below.

* * * * *